(12) United States Patent
Tsuchizawa et al.

(10) Patent No.: US 10,889,351 B2
(45) Date of Patent: Jan. 12, 2021

(54) BICYCLE CONTROLLER FOR BICYCLE EQUIPPED WITH ASSIST DEVICE AND GEAR CHANGE DEVICE

(71) Applicant: Shimano Inc., Osaka (JP)

(72) Inventors: Yasuhiro Tsuchizawa, Osaka (JP); Hiroshi Matsuda, Osaka (JP); Tomohiro Kondo, Osaka (JP)

(73) Assignee: Shimano Inc., Osaka (JP)

( * ) Notice: Subject to any disclaimer, the term of this patent is extended or adjusted under 35 U.S.C. 154(b) by 497 days.

(21) Appl. No.: 15/419,662

(22) Filed: Jan. 30, 2017

(65) Prior Publication Data
US 2017/0297651 A1 Oct. 19, 2017

(30) Foreign Application Priority Data

Apr. 15, 2016 (JP) ................................ 2016-082093

(51) Int. Cl.
*B62M 6/50* (2010.01)
*B60W 30/19* (2012.01)
(Continued)

(52) U.S. Cl.
CPC .............. *B62M 6/50* (2013.01); *B60W 10/08* (2013.01); *B60W 10/11* (2013.01);
(Continued)

(58) Field of Classification Search
CPC . B62M 6/00; B62M 6/10; B62M 6/20; B62M 6/25; B62M 6/30; B62M 6/35;
(Continued)

(56) References Cited

U.S. PATENT DOCUMENTS 5,370,200 A * 12/1994 Takata .................. B60L 3/0092
180/206.4
6,163,148 A * 12/2000 Takada ..................... B62M 6/45
180/206.3
(Continued)

FOREIGN PATENT DOCUMENTS

EP 0893338 A1 * 1/1999 .............. B62M 6/45
EP 2724925 A1 * 4/2014 .............. B62M 6/45
(Continued)

OTHER PUBLICATIONS

Tanida, Masato—English Translation of JP2007161219A via Espacenet Patent Translate, Dec. 4, 2019 (Year: 2019).*
(Continued)

*Primary Examiner* — Jeffrey C Boomer
*Assistant Examiner* — Paul Allen
(74) *Attorney, Agent, or Firm* — Global IP Counselors, LLP

(57) ABSTRACT

A bicycle controller is provided that performs control in accordance with a riding condition of a bicycle. The bicycle controller includes an electronic control unit that controls a motor. The motor assists human power that is inputted to a bicycle. Upon determining a gear changer that changes a gear ratio of the bicycle is operated, the electronic control unit switches a control state of the motor from a first control state to a second control state based on a rotation phase of a crank of the bicycle and changes a timing at which the control state of the motor is switched from the first control state to the second control state based on an inclination of the bicycle in a front-rear direction.

21 Claims, 10 Drawing Sheets

(51) Int. Cl.
  *B60W 10/08* (2006.01)
  *B60W 10/11* (2012.01)
  *B60W 30/188* (2012.01)
  *B62M 25/08* (2006.01)
  *B62K 23/02* (2006.01)
  *B62M 6/55* (2010.01)

(52) U.S. Cl.
  CPC .......... *B60W 30/188* (2013.01); *B60W 30/19* (2013.01); *B62M 25/08* (2013.01); *B60W 2300/36* (2013.01); *B60W 2510/09* (2013.01); *B60W 2510/1005* (2013.01); *B60W 2520/16* (2013.01); *B60W 2552/15* (2020.02); *B60W 2710/08* (2013.01); *B60W 2710/1005* (2013.01); *B62K 23/02* (2013.01); *B62M 6/55* (2013.01)

(58) Field of Classification Search
  CPC . B62M 6/40; B62M 6/45; B62M 6/50; B62M 6/55; B62M 6/60; B62M 6/65; B62M 6/70; B62M 6/75; B62M 6/80; B62M 6/85; B62M 6/90; B62M 9/06; B62M 25/08; B60W 10/04; B60W 10/06; B60W 10/08; B60W 10/11; B60W 10/111; B60W 10/113; B60W 10/115; B60W 30/184; B60W 30/30; B60W 30/1843; B60W 30/1846; B60W 30/19; B60W 2300/36; B60W 2550/142; B60W 2520/16; B60W 2510/1005; B60W 2710/08; B60W 2710/1005; B62K 2207/04; B62K 23/02; F16H 61/682; F16H 2306/42; F16H 2306/44; B60L 2260/26
  USPC .......................................................... 701/22
  See application file for complete search history.

(56) References Cited

U.S. PATENT DOCUMENTS

| | | | | |
|---|---|---|---|---|
| 7,062,980 B2 * | 6/2006 | Takamoto | ............... | B62M 9/122 73/862.31 |
| 8,777,804 B2 * | 7/2014 | Takachi | ............... | B60W 20/10 180/206.3 |
| 8,781,663 B2 * | 7/2014 | Watarai | ............... | B62M 6/45 701/22 |
| 8,831,810 B2 * | 9/2014 | Shoge | ............... | B62M 6/45 701/22 |
| 8,886,426 B2 * | 11/2014 | Cheng | ............... | B62M 6/45 701/64 |
| 8,972,086 B2 * | 3/2015 | Komatsu | ............... | B62M 6/45 701/22 |
| 8,977,450 B2 * | 3/2015 | Cheng | ............... | B62M 9/123 474/70 |
| 9,243,692 B2 * | 1/2016 | Wesling | ............... | F16H 9/06 |
| 2013/0054065 A1 | 2/2013 | Komatsu | | |
| 2013/0054102 A1 | 2/2013 | Cheng | | |
| 2013/0090819 A1 | 4/2013 | Cheng | | |
| 2017/0073040 A1 * | 3/2017 | Djakovic | ............... | B62M 6/45 |
| 2018/0319457 A1 * | 11/2018 | Santucci | ............... | B62M 6/55 |

FOREIGN PATENT DOCUMENTS

| | | | | |
|---|---|---|---|---|
| EP | 2848514 A1 * | 3/2015 | ............. | B60L 50/20 |
| EP | 2 862 788 A1 | 4/2015 | | |
| EP | 2 862 789 A1 | 4/2015 | | |
| JP | 2007161219 A * | 6/2007 | ............. | B62M 6/50 |
| JP | 2013-47082 A | 3/2013 | | |
| JP | 2013-0471082 A | 3/2013 | | |
| JP | 5575968 B1 * | 8/2014 | ............. | B62M 6/45 |

OTHER PUBLICATIONS

Tsuchizawa—English Translation of JP-5575968-B1 Description via Espacenet Patent Translate, retrieved Apr. 21, 2020. (Year: 2020).*

"Passive Low Pass Filter"—Electronics—Tutorials.ws publication, captured via archive.org Apr. 7, 2013, (Year: 2013).*

\* cited by examiner

BICYCLE CONTROLLER FOR BICYCLE EQUIPPED WITH ASSIST DEVICE AND GEAR CHANGE DEVICE

CROSS-REFERENCE TO RELATED APPLICATIONS

This application claims priority to Japanese Patent Application No. 2016-082093, filed on Apr. 15, 2016. The entire disclosure of Japanese Patent Application No. 2016-082093 is hereby incorporated herein by reference.

BACKGROUND

Field of the Invention

The present invention relates to a bicycle controller.

Background Information

Japanese Laid-Open Patent Publication No. 2013-47082 describes a bicycle controller that controls the torque of a motor to be a predetermined value so that the motor torque will not become less than the predetermined value in a predetermined range of the rotation phase of the crank including the top dead center and the bottom dead center. Upon determining there is a gear change request that operates a gear changer of the bicycle, it is preferred that the gear changer be operated upon determining the torque applied to the gear changer is minimal. Thus, upon receiving the gear change request, the bicycle controller does not control the motor torque at the predetermined value when the rotation phase is in a predetermined range of the in which the torque applied to the gear changer is small.

SUMMARY

The relationship between the torque applied to the gear changer and the rotation angle of the crank changes in accordance with the riding condition of the bicycle. The above bicycle controller performs control in response to the gear change request based on the rotation phase of the crank without taking into consideration the riding condition. Thus, there is room for improvement.

One object of the present invention is to provide a bicycle controller that performs control in accordance with a riding condition of a bicycle.

A first aspect of a bicycle controller according to the present invention includes an electronic control unit is configured to control a motor that assists human power inputted to a bicycle. Upon determining a gear changer is operated to change a gear ratio of the bicycle, the electronic control unit is configured to switch a control state of the motor from a first control state to a second control state based on a rotation phase of a crank of the bicycle and changes a timing at which the control state of the motor is switched from the first control state to the second control state based on an inclination of the bicycle in a front-rear direction.

In a second aspect of the bicycle controller according to the previous aspect, upon determining the rotation phase of the crank of the bicycle is a first phase, the electronic control unit is configured to switch the control state of the motor from the first control state to the second control state.

In a third aspect of the bicycle controller according to any of the previous aspects, upon determining the inclination is greater than 0° and an uphill gradient, the electronic control unit is configured to retard the first phase from that set for the inclination of 0°.

In a fourth aspect of the bicycle controller according to any of the previous aspects, upon determining the inclination is less than 0° and a downhill gradient, the electronic control unit is configured to advance the first phase from that set for the inclination of 0°.

In a fifth aspect of the bicycle controller according to any of the previous aspects, the electronic control unit further is configured to retard the first phase as the inclination increases.

In a sixth aspect of the bicycle controller according to any of the previous aspects, upon determining the rotation phase of the crank reaches a third phase while the motor is in the second control state, the electronic control unit is configured to switch the control state of the motor from the second control state to the first control state.

In a seventh aspect of the bicycle controller according to any of the previous aspects, upon determining a predetermined time elapses from upon determining switching the control state of the motor from the first control state to the second control state, the electronic control unit switches the control state of the motor from the second control state to the first control state.

In an eighth aspect of the bicycle controller according to any of the previous aspects, upon determining an operation of the gear changer is completed while the motor is in the second control state, the electronic control unit is configured to switch the control state of the motor from the second control state to the first control state.

In a ninth aspect of the bicycle controller according to any of the previous aspects, the electronic control unit is configured to set a ratio of an output of the motor to the human power upon determining the motor is in the second control state to be less than a ratio of an output of the motor to the human power while the motor is in the first control state.

In a tenth aspect of the bicycle controller according to any of the previous aspects, upon determining the human power is decreased while the motor is in the first control state, the electronic control unit is configured to set a ratio of an output of the motor to the human power to be greater than that obtained when the human power is increased while the motor is in the first control state.

In an eleventh aspect of the bicycle controller according to any of the previous aspects, upon determining receiving a gear change signal from an operation unit, the electronic control unit is configured to operate the gear changer when the rotation phase of the crank is a second phase.

In a twelfth aspect of the bicycle controller according to any of the previous aspects, the electronic control unit is configured to change the second phase based on the inclination.

A thirteenth aspect of a bicycle controller according to the present invention includes an electronic control unit is configured to control an operation of a gear changer that changes a gear ratio of a bicycle based on a gear change signal received from an operation unit. The electronic control unit is configured to operate the gear changer upon determining a rotation phase of a crank is a second phase, and change the second phase based on an inclination of the bicycle in a front-rear direction.

In a fourteenth aspect of the bicycle controller according to any of the eleventh to thirteenth aspects, upon determining the inclination is 0°, the electronic control unit is configured to set the second phase to be substantially equal to a rotation phase of the crank when the crank is located at one of a top dead center position and a bottom dead center position.

In a fifteenth aspect of the bicycle controller according to any of the eleventh to fourteenth aspects, upon determining the inclination is greater than 0° and an uphill gradient, the electronic control unit is configured to retard the second phase from that set for the inclination of 0°.

In a sixteenth aspect of the bicycle controller according to any of the eleventh to fourteenth aspects, upon determining the inclination is less than 0° and a downward gradient, the electronic control unit is configured to advance the second phase from that set for the inclination of 0°.

In a seventeenth aspect of the bicycle controller according to any of the eleventh to sixteenth aspects, the electronic control unit further is configured to retard the second phase as the inclination increases.

In an eighteenth aspect of the bicycle controller according to any of the eleventh to seventeenth aspects, upon determining the rotation phase of the crank of the bicycle is a first phase, the electronic control unit is configured to switch the control state of the motor from the first control state to the second control state, and set the second phase to be substantially equal to the first phase or retarded from the first phase by a predetermined phase.

In a nineteenth aspect of the bicycle controller according to any of the previous aspects, the electronic control unit is configured to calculate the inclination based on an output of an inclination sensor that detects the inclination.

In a twentieth aspect of the bicycle controller according to any of the previous aspects, the electronic control unit is configured to calculate the rotation phase of the crank based on an output of a sensor that detects the rotation phase of the crank.

The bicycle controller of the present invention performs control in accordance with a riding condition of a bicycle.

DESCRIPTION OF THE EMBODIMENTS

Selected embodiments of a bicycle drive unit will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
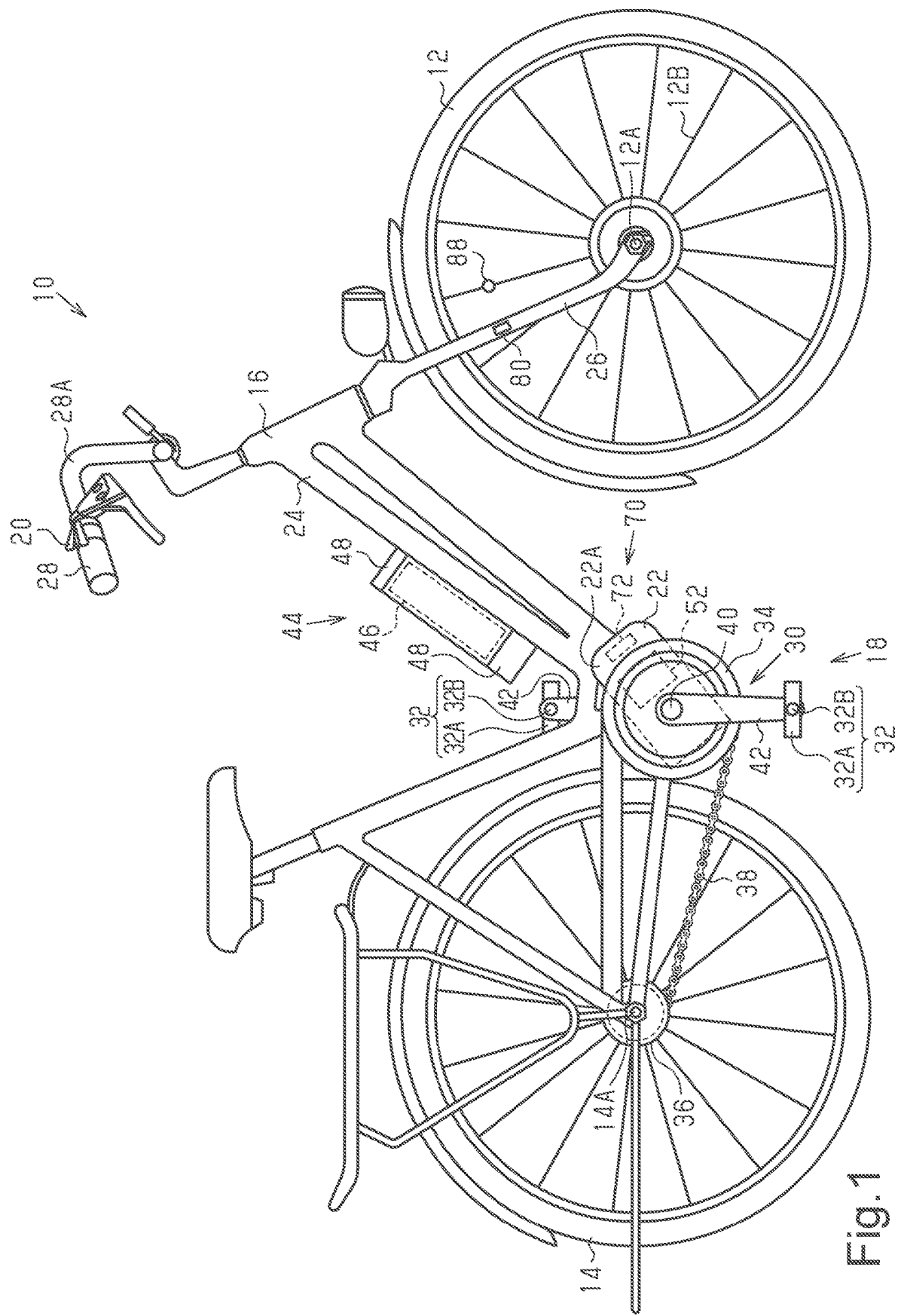
FIG. 1 is a side view of a bicycle that includes one embodiment of a bicycle controller.

A bicycle on which a first embodiment of a bicycle controller is mounted will now be described with reference to FIGS. 1 to 9. As shown in FIG. 1, a bicycle 10 includes a front wheel 12, a rear wheel 14, a bicycle body 16, a drive mechanism 18, an operation unit 20, a drive unit 22 and a bicycle controller 70. The bicycle body 16 includes a frame 24, a front fork 26, which is connected to the frame 24 and a handlebar 28, which is connected to the front fork 26 by a stem 28A in a removable manner. The front fork 26 is supported by the frame 24 and connected to an axle 12A of the front wheel 12.

When human power is transmitted to the rear wheel 14 through the drive mechanism 18, the bicycle 10 is propelled forward. The drive mechanism 18 includes a crank 30, a pair of pedals 32, a front sprocket 34, a rear sprocket 36 and a chain 38.

The crank 30 includes a crank axle 40 and a pair of crank arms 42. The drive unit 22 includes a housing 22A, which is coupled to the frame 24 and rotationally supports the crank axle 40. The crank arms 42 are coupled to the crank axle 40. Each of the pedals 32 includes a pedal body 32A and a pedal shaft 32B. The pedal shaft 32B is coupled to the corresponding one of the crank arms 42. The pedal body 32A is supported by the corresponding pedal shaft 32B so as to be rotatable relative to the pedal shaft 32B.

The front sprocket 34 is coupled to the crank axle 40 by the drive unit 22. The front sprocket 34 is arranged to be coaxial with the crank axle 40. The rear sprocket 36 is arranged on the rear wheel 14 and rotational about an axle 14A of the rear wheel 14. The rear sprocket 36 is coupled to the rear wheel 14. The rear wheel 14 includes a hub (not shown). The chain 38 runs around the front sprocket 34 and the rear sprocket 36. When human power is applied to the pedals 32 to rotate the crank 30 in one direction, the front sprocket 34, the chain 38 and the rear sprocket 36 rotate the rear wheel 14 in one direction.

Figure 2:
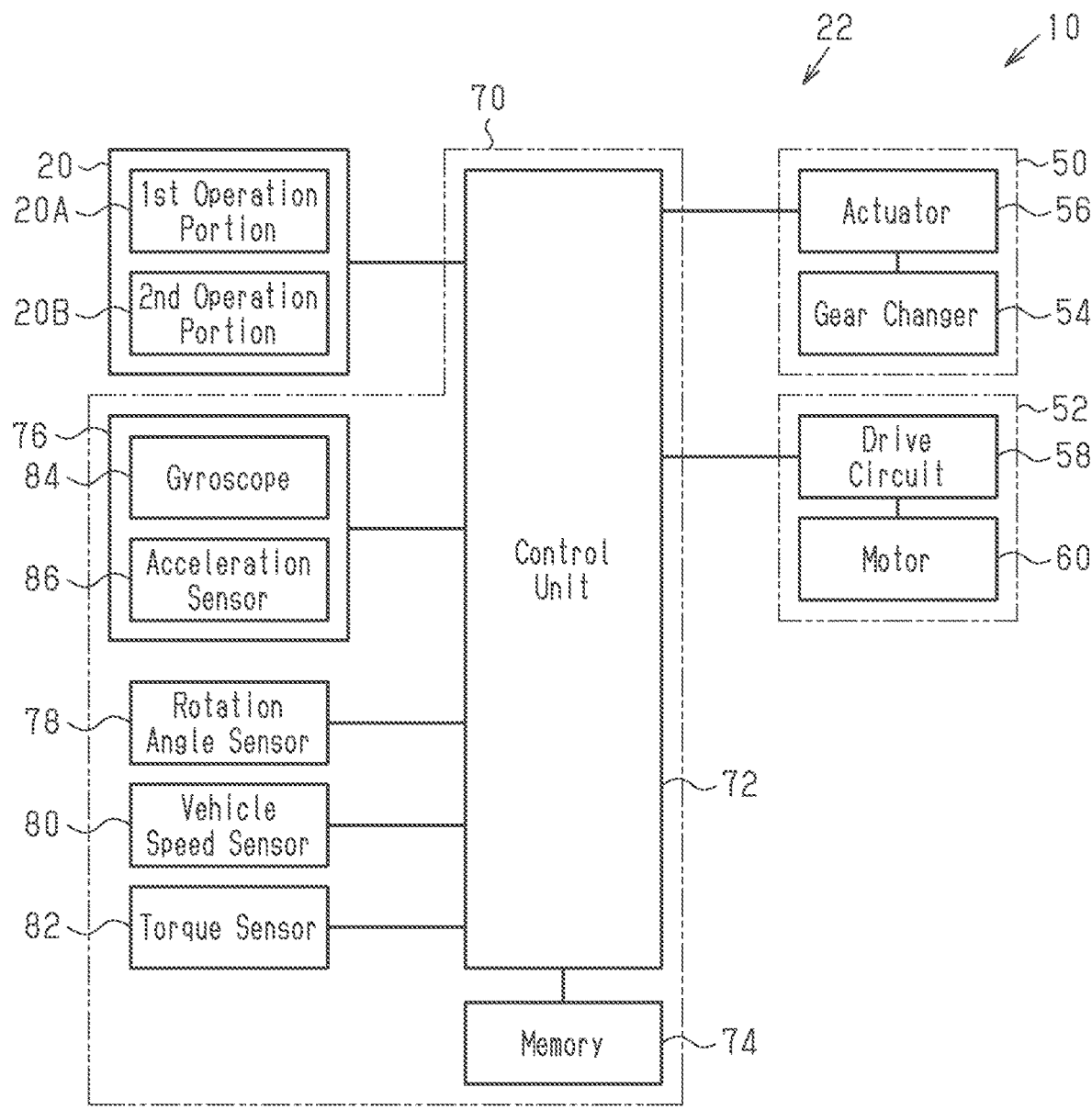
FIG. 2 is a block diagram showing the bicycle controller of FIG. 1.

The operation unit 20 is coupled to the handlebar 28. The bicycle controller 70 includes an electronic control unit 72 (refer to FIG. 2), which is connected to the operation unit 20 and configured to perform wired or wireless communication with the operation unit 20. Hereafter, the electronic control unit 72 will be simply referred to as "the control unit 72" for the sake of brevity. As shown in FIG. 2, the operation unit 20 includes a first operation portion 20A and a second operation portion 20B. When the operator operates the first operation portion 20A, the operation unit 20 transmits a gear change signal for increasing a gear ratio r of the bicycle 10 (hereafter, referred to as "shift-up signal") to the control unit 72. When the operator operates the second operation portion 20B, the operation unit 20 transmits a gear change signal for decreasing the gear ratio r of the bicycle 10 (hereafter, referred to as "shift-down signal") to the control unit 72.

FIG. 1 shows a battery unit 44 that includes a battery 46 and a battery holder 48, which attaches the battery 46 to the frame 24 in a removable manner. The battery 46 includes one or more battery cells. The battery 46 includes a rechargeable battery. The battery 46 is electrically connected to a motor 60 of the drive unit 22 to supply electric power to the motor 60.

The drive unit 22 includes the housing 22A, a gear change device 50 (refer to FIG. 2) and an assist device 52. The housing 22A is located on the frame 24. The housing 22A accommodates the gear change device 50 (refer to FIG. 2) and the assist device 52.

As shown in FIG. 2, the gear change device 50 includes a gear changer 54 and an actuator 56. The gear changer 54 changes the speed of rotation that is inputted to the crank axle 40 (refer to FIG. 1) and transmits the rotation to the front sprocket 34 (refer to FIG. 1). The gear change device 50 changes the gear ratio r of the bicycle 10. The gear changer 54 includes a planetary gear mechanism. When the actuator 56 is driven to change the engagement state of gears, which form the planetary gear of the gear changer 54, the gear change device 50 changes the gear ratio r of the bicycle 10 in a stepped manner.

The assist device 52 includes a drive circuit 58 and the motor 60. The drive circuit 58 controls electric power supplied to the motor 60 from the battery 46. The motor 60 assists human power that is inputted to the bicycle 10. The motor 60 includes an electric motor. The motor 60 is coupled to the crank axle 40 or the gear changer 54. It is preferred that a one-way clutch (not shown) be arranged in a power transmission path extending between the motor 60 and the crank axle 40 or the gear changer 54 so that when the crank 30 forwardly rotates, the rotational force of the crank axle 40 will not produce rotation in the motor 60.

The bicycle controller 70 includes the control unit 72. In one example, it is preferred that the bicycle controller 70 include a memory 74, an inclination sensor 76, a rotation angle sensor 78, a vehicle speed sensor 80 and a torque sensor 82.

The control unit 72 includes an arithmetic processing unit that executes predetermined control programs. The arithmetic processing unit includes, for example, a central processing unit (CPU) or a micro processing unit (MPU) having a processor that executes the control programs. The memory 74 stores information used by various kinds of control programs and various kinds of control processes.

The inclination sensor 76 detects the inclination of the bicycle 10 with respect to level ground. The inclination sensor 76 is located on the frame 24 (refer to FIG. 1) or the drive unit 22. The inclination sensor 76 is connected to the control unit 72 and configured to perform wired or wireless communications with the control unit 72. The inclination sensor 76 includes a three-axis gyroscope 84 and a three-axis acceleration sensor 86. An output of the inclination sensor 76 includes information of the position angle with respect to each of the three axes and the acceleration with respect to each of the three axes. The position angles of the three axes include a pitch angle DA, a roll angle DB and a yaw angle DC. It is preferred that the three axes of the gyroscope 84 conform to the three axes of the acceleration sensor 86. It is preferred that the inclination sensor 76 be coupled to the frame 24 or the drive unit 22 so that the lateral direction of the bicycle body 16 shown in FIG. 1 substantially conforms to the direction in which the axis for the pitch angle DA extends.

The rotation angle sensor 78 detects the rotational speed of the crank axle 40 and the rotation phase of the crank. The rotation angle sensor 78 is coupled to the frame 24 (refer to FIG. 1). The rotation angle sensor 78 includes a first element (not shown), which detects the magnetic field of a first magnet (not shown), and a second element (not shown), which outputs a signal corresponding to the positional relationship between the second element and a second magnet (not shown). The first magnet is arranged on the crank axle 40 or the crank arm 42, which is shown in FIG. 1, to be coaxial with the crank axle 40. The first magnet is an annular magnet in which different magnetic poles are alternately arranged in the circumferential direction. The first element detects the rotation phase of the crank 30 relative to the frame 24 or the housing 22A. The first element outputs a signal in each cycle that corresponds to the angle obtained by dividing 360° by the number of the same magnetic poles when the crank 30 rotates once. The rotation angle sensor 78 is configured to detect a rotation phase RA of the crank 30, the minimum value of which is 180° or less. The minimum value is preferably 15° and more preferably 6°. The second magnet is arranged on the crank axle 40 or the crank arms 42 to be coaxial with the crank axle 40. The second element detects the reference phase (e.g., top dead center position or bottom dead center position of the crank 30) relative to the frame 24 or the housing 22A. The second element outputs a signal in each cycle that corresponds to one rotation of the crank axle 40. The top dead center position of the crank 30 refers to the state in which the crank arms 42 extend in a direction orthogonal to a ground surface and one of the pedals 32 is located farthest from the ground surface. The bottom dead center position of the crank 30 refers to the state in which the crank arms 42 extend in the direction orthogonal to the ground surface and the other pedal 32 is located farthest from the ground surface. It is preferred that the difference in phase be 180° between the top dead center position and the bottom dead center position.

The vehicle speed sensor 80 shown in FIG. 2 is electrically connected to the control unit 72 by a wired or wireless configuration. The vehicle speed sensor 80 is coupled to the front fork 26, which is shown in FIG. 1. The vehicle speed sensor 80 transmits a value to the control unit 72 in correspondence with a change in position relative to a magnet 88 coupled to a spoke 12B of the front wheel 12. It is preferred that the vehicle speed sensor 80 include a magnetic reed, which forms a reed switch, or a Hall Effect element.

The torque sensor 82 shown in FIG. 2 outputs a signal corresponding to human power. The torque sensor 82 detects human power applied to the crank 30 (refer to FIG. 1). Referring to FIG. 1, the torque sensor 82 can be located between the crank axle 40 and the front sprocket 34. Alternatively, the torque sensor 82 can be located on the crank axle 40, the front sprocket 34, the crank arms 42, or the pedals 32. The torque sensor 82 can be realized, for example, with a strain sensor, a magnetostrictive sensor, an optical sensor, or a pressure sensor. Any sensor can be used as long as the sensor outputs a signal corresponding to the human power applied to the crank arms 42 or the pedals 32.

The control unit 72 calculates an inclination D based on outputs of the inclination sensor 76 and the vehicle speed sensor 80. The inclination D is the angle of the bicycle 10 in the front-rear direction inclined with respect to the axis extending in the lateral direction of the bicycle body 16 (refer to FIG. 1). More specifically, the inclination D is the pitch angle DA of the bicycle 10. The inclination D is set to be 0° when the bicycle body 16 is located at a horizontal position. Thus, the inclination D is correlated with the gradient of a road on which the bicycle 10 travels.

The control unit 72 calculates the pitch angle DA, the roll angle DB and the yaw angle DC from outputs of the gyroscope 84. The control unit 72 calculates a first acceleration vector in the front-rear direction of the bicycle body 16 (refer to FIG. 1) from the acceleration sensor 86. The control unit 72 calculates a second acceleration vector from outputs of the vehicle speed sensor 80. The control unit 72 corrects the pitch angle DA, the roll angle DB and the yaw angle DC based on the first acceleration vector and the second acceleration vector to reduce errors included in the pitch angle DA, the roll angle DB and the yaw angle DC. More specifically, the control unit 72 calculates a correction angle for each of the pitch angle DA, the roll angle DB and the yaw angle DC based on the difference between the first acceleration vector and the second acceleration vector. The control unit 72 adds the respective correction angles to the pitch angle DA, the roll angle DB and the yaw angle DC. Then, the control unit 72 calculates the inclination D based on the corrected pitch angle DA, the corrected roll angle DB, the corrected yaw angle DC and the initial value of the inclination of the bicycle 10. When the inclination sensor 76 is coupled to the bicycle 10 so that the lateral direction of the bicycle body 16 (refer to FIG. 1) substantially conforms to the direction in which the axis of the pitch angle DA extends, the inclination D can be calculated based on the pitch angle DA, the roll angle DB and the initial value of the inclination of the bicycle 10. When the inclination sensor 76 is coupled to the bicycle 10 so that the lateral direction of the bicycle body 16 (refer to FIG. 1) substantially conforms to the direction in which the axis of the pitch angle DA extends and also so that the front-rear direction of the bicycle body 16 (refer to FIG. 1) substantially conforms to the axis of the roll angle DB, the inclination D can be calculated based on the pitch angle DA and the initial value of the inclination of the bicycle 10.

The control unit 72 calculates the rotation phase of the crank 30 (hereafter, referred to as "crank rotation phase RA) based on outputs of the rotation angle sensor 78. The control unit 72 calculates the crank rotation phase RA with the top dead center position or the bottom dead center position of the crank 30 set to 0°. The rotation phase RA of the crank 30 is 0° or greater and less than 360°.

The control unit 72 calculates the rotational speed of the crank axle 40 (hereafter, referred to as "crank rotational speed CA") based the outputs of the rotation angle sensor 78. The control unit 72 calculates the travel distance per unit time (hereafter, referred to as "vehicle speed V") based on outputs of the vehicle speed sensor 80 and the circumferential length of the front wheel 12 (refer to FIG. 1), which is stored in the memory 74 in advance. The control unit 72 calculates human power per unit time (hereafter, referred to as "human power T") based on outputs of the torque sensor 82.

The control unit 72 performs gear change control that controls the gear changer 54 based on the shift-up signal and the shift-down signal, which are received from the operation unit 20. Upon receiving the shift-up signal, the control unit 72 operates the gear changer 54 to increase the gear ratio r. Upon receiving the shift-down signal, the control unit 72 operates the gear changer 54 to decrease the gear ratio r.

The control unit 72 controls the motor 60. The control unit 72 performs assist control that controls the motor 60 based on the human power T and the vehicle speed V. The control unit 72 switches the control state of the motor 60 between a first control state and a second control state. Upon determining the vehicle speed V is greater than or equal to a predetermined vehicle speed V, the control unit 72 stops the driving of the motor 60. The predetermined vehicle speed V is, for example, 25 km per hour. The control unit 72 controls the motor 60 so that an output TA of the motor 60 is set to be less than or equal to a predetermined output TA.

Upon determining the human power T is increased while the motor 60 is in the first control state, the control unit 72 enables the motor 60 to output a value obtained by multiplying the human power T and a predetermined coefficient. It is preferred that the predetermined coefficient be set to different values. The predetermined coefficient can be changed, for example, when the user operates the operation unit 20. It is preferred that the predetermined coefficient be 0 or greater and 3 or less. Upon determining the human power T is decreased while the motor 60 is in the first control state, the control unit 72 sets the ratio of the output TA of the motor 60 to the human power T to be greater than that obtained when the human power T is increased while the motor 60 is in the first control state.

Upon determining the motor 60 is in the second control state, the control unit 72 sets the ratio of the output TA of the motor 60 to the human power T to be less than the ratio of the output TA of the motor 60 to the human power T while the motor 60 is in the first control state. In one example, the control unit 72 sets the ratio of the output TA of the motor 60 to the human power T while the motor 60 is in the second control state and the human power T is decreased to be equal to the ratio of the output TA of the motor 60 to the human power T while the motor 60 is in the first control state and the human power T is increased.

Figure 3:
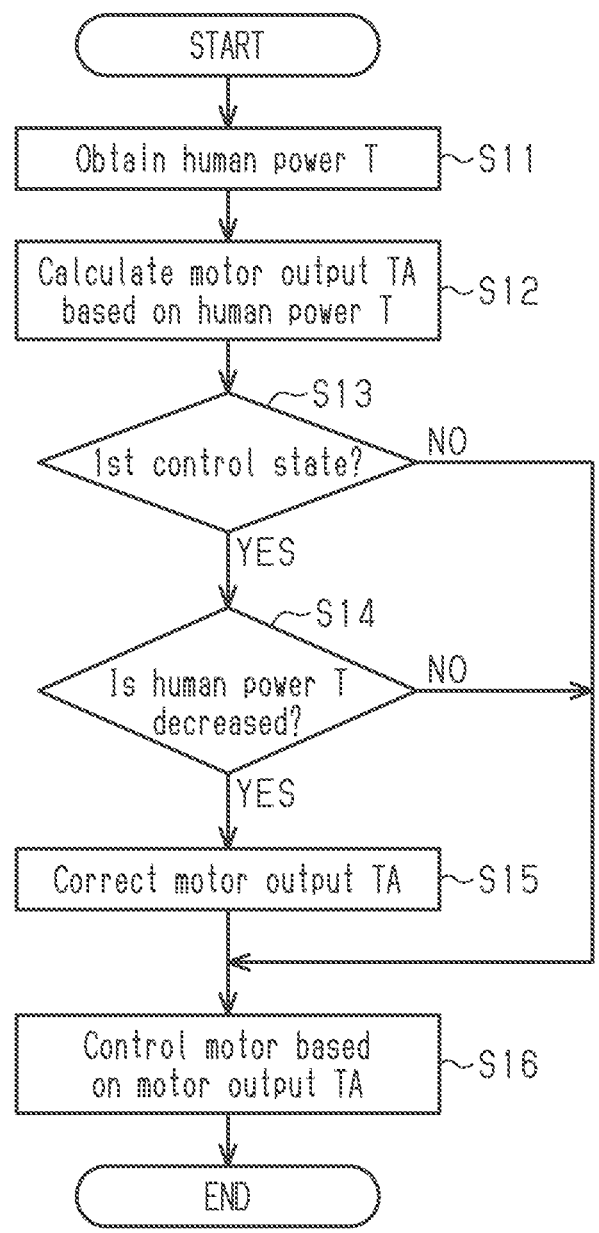
FIG. 3 is a flowchart showing assist control performed by an electronic control unit of FIG. 2.

The assist control will now be described with reference to FIG. 3. The assist control of FIG. 3 is executed by the control unit 72 which is programmed to control the output TA of the motor 60.

In step S11, the control unit 72 obtains the human power T. In step S12, the control unit 72 calculates the output TA of the motor 60 based on the human power T and then proceeds to step S13. The control unit 72 sets the output TA of the motor 60, for example, to a value obtained by multiplying the human power T and a predetermined coefficient.

In step S13, the control unit 72 determines whether or not the motor 60 is in the first control state. Upon determining the motor 60 is in the first control state, in step S14, the control unit 72 determines whether or not the human power T is decreased. The control unit 72, for example, converts signals received from the torque sensor 82 into discrete signals. Upon the control unit 72 determining that the human power T is less than that detected at the preceding time based on the discrete signals, the control unit 72 determines that the human power T has been decreased.

Upon determining the human power T is decreased in the first control state, in step S15, the control unit 72 corrects the output TA of the motor 60, which was calculated in step S12, and then proceeds to step S16. More specifically, upon determining the human power T is decreased, the control unit 72 corrects the output TA of the motor 60 so that decreases in the output TA of the motor 60 are delayed relative to the decrease in the human power T. The output TA of the motor 60 after the correction is greater than or equal to the output TA of the motor 60 before the correction. The control unit 72 corrects the output TA of the motor 60, for example, using a first-order low-pass filter. When the control unit 72 corrects the output TA of the motor 60 using the first-order low-pass filter, decreases in the output TA of the motor 60 are delayed relative to the decrease in the human power. The time constant used in the first-order low-pass filter can be changed in accordance with the rotational speed of the crank 30. Alternatively, different time constant maps corresponding to rotational speeds of the crank 30 can be stored in the memory 74, and the maps can be selectively switched in accordance with a predetermined condition.

In step S13, upon determining the motor 60 is not in the first control state, that is, the motor 60 is in the second control state, the control unit 72 proceeds to step S16 without correcting the output TA of the motor 60. Also, in step S14, upon the control unit 72 determining that the human power T has not decreased, the control unit 72 proceeds to step S16 without correcting the output TA of the motor 60. In step S16, the control unit 72 controls the motor 60 based on the output TA of the motor 60 and then performs the processes from step S11 again after a predetermined period.

Upon determining the gear changer 54 is operated to change the gear ratio r of the bicycle 10, the control unit 72 switches the control state of the motor 60 from the first control state to the second control state based on the rotation phase of the crank of the bicycle 10 and changes a timing at which the control state of the motor 60 is switched from the first control state to the second control state based on the inclination D of the bicycle 10 in the front-rear direction. In one example, the control unit 72 switches the control state of the motor 60 from the first control state to the second control state upon determining the crank rotation phase RA of the bicycle 10 is a first phase R1. Upon receiving a gear change signal from the operation unit 20, the control unit 72 operates the gear changer 54 upon determining the crank rotation phase RA is a second phase R2. Upon the crank rotation phase RA reaching a third phase R3 while the motor 60 is in the second control state, the control unit 72 switches the control state of the motor 60 to the first control state from the second control state.

A reference phase for each of the first phase R1, the second phase R2 and the third phase R3 is stored in the memory 74 in advance. The reference second phase R2 is substantially equal to the crank rotation phase RA when the crank is located at the top dead center or the bottom dead center. The second phase R2 is retarded from the first phase R1 by a predetermined phase RB (refer to FIG. 5). The predetermined phase RB corresponds to the crank rotation phase RA that is sufficient to decrease the output TA of the motor 60. The third phase R3 is retarded from the second phase R2 by a predetermined phase RC (refer to FIG. 5). The predetermined phase RC corresponds to the crank rotation phase RA that is sufficient for the gear changer 54 (refer to FIG. 2) to complete a gear change operation. The term "retarded" means that the crank rotation phase RA is increased, that is, the timing is delayed. The term "advanced" means that the crank rotation phase RA is decreased, that is, the timing is set forward. It is preferred that two timings that differ from each other by 180° be set for each of the first phase R1, the second phase R2 and the third phase R3 in one cycle of the crank.

The control unit 72 changes the first phase R1 based on the inclination D. Upon determining the inclination D is greater than 0° which indicates an uphill gradient, the control unit 72 retards the first phase R1 from that set for the inclination D of 0°. Upon determining the inclination D is less than 0° which indicates a downhill gradient, the control unit 72 advances the first phase R1 from that set for the inclination D of 0°. The control unit 72 further retards the first phase R1 as the inclination D increases. Upon determining the inclination D is 0°, the control unit 72 does not correct the reference first phase R1, which is stored in the memory 74 in advance.

The control unit 72 changes the second phase R2 based on the inclination D. Upon determining the inclination D is greater than 0° which indicates an uphill gradient, the control unit 72 retards the second phase R2 from that set for the inclination D of 0°. Upon determining the inclination D is less than 0° which indicates a downhill gradient, the control unit 72 advances the second phase R2 from that set for the inclination D of 0°. The control unit 72 further retards the second phase R2 as the inclination D increases. Upon determining the inclination D is 0°, the control unit 72 does not correct the reference second phase R2, which is stored in the memory 74 in advance. Thus, upon determining the inclination D is 0°, the control unit 72 sets the second phase R2 to be substantially equal to the crank rotation phase RA obtained while the crank 30 is located at one of the top dead center position and the bottom dead center position.

The control unit 72 changes the third phase R3 based on the inclination D. Upon determining the inclination D is greater than 0° which indicates an uphill gradient, the control unit 72 retards the third phase R3 from that set for the inclination D of 0°. Upon determining the inclination D is less than 0° which indicates a downhill gradient, the control unit 72 advances the third phase R3 from that set for the inclination D of 0°. The control unit 72 retards further the third phase R3 as the inclination D increases. Upon determining the inclination D is 0°, the control unit 72 does not correct the reference third phase R3, which is stored in the memory 74 in advance.

The gear change control will now be described with reference to FIGS. 4 and 5.

In step S21, the control unit 72 determines whether or not there is a gear change request. More specifically, the control unit 72 determines whether or not the shift-up signal or the shift-down signal has been received. Upon determining that there is a gear change request, in step S22, the control unit 72 obtains the inclination D and then proceeds to step S23. In step S23, the control unit 72 corrects the first phase R1, the second phase R2 and the third phase R3 based on the inclination D. As shown in FIG. 5, the control unit 72, for example, retards or advances the first phase R1, the second phase R2 and the third phase R3 as the inclination D increases. The first phase R1 is set to be advanced from the second phase R2 at any inclination D. The third phase R3 is set to be retarded from the second phase R2 at any inclination D. Upon determining the inclination D is 0°, the control unit 72 uses the reference first phase R1, the reference second phase R2 and the reference third phase R3, which are stored in the memory 74 in advance. Alternatively, the first phase R1, the second phase R2 and the third phase R3 can be set using a map or an arithmetic expression that sets the relationship between each of the first phase R1, the second phase R2 and the third phase R3 and the inclination D instead of using the reference first phase R1, the reference second phase R2 and the reference third phase R3.

In step S24, the control unit 72 determines whether or not the rotation phase RA has reached the first phase R1. Upon determining the rotation phase RA is not the first phase R1, the control unit 72 performs the process of step S24 again after a predetermined period. The control unit 72 repeats the process of step S24 until the rotation phase RA reaches the first phase R1. Upon determining the rotation phase RA has reached the first phase R1, in step S25, the control unit 72 switches the control state of the motor 60 from the first control state to the second control state and then proceeds to step S26.

In step S26, the control unit 72 determines whether or not the rotation phase RA has reached the second phase R2. Upon determining the rotation phase RA is not the second phase R2, the control unit 72 performs the process of step S26 again after a predetermined period. The control unit 72 repeats the process of step S26 until the rotation phase RA reaches the second phase R2. Upon determining the rotation phase RA has reached the second phase R2, in step S27, the control unit 72 operates the gear changer 54 based on the gear change signal and then proceeds to step S28.

In step S28, the control unit 72 determines whether or not the rotation phase RA has reached the third phase R3. Upon determining the rotation phase RA is not the third phase R3, the control unit 72 performs the process of step S28 again after a predetermined period. The control unit 72 repeats the process of step S28 until the rotation phase RA reaches the third phase R3. Upon determining the rotation phase RA has reached the third phase R3, in step S29, the control unit 72 switches the control state of the motor 60 to the first control state from the second control state and ends the current process.

The operation of the bicycle controller 70 will now be described with reference to FIGS. 6 to 9. As shown in part A of FIG. 6, when the bicycle 10 is traveling on a flat road, the inclination D of which is 0°, the human power T becomes minimal at the top dead center position and the bottom dead center position (i.e., the crank rotation phase RA is 0° and 180°) and maximal in middle positions between the top dead center position and the bottom dead center position (i.e., the crank rotation phase RA is 90° and 270°).

Figure 6:
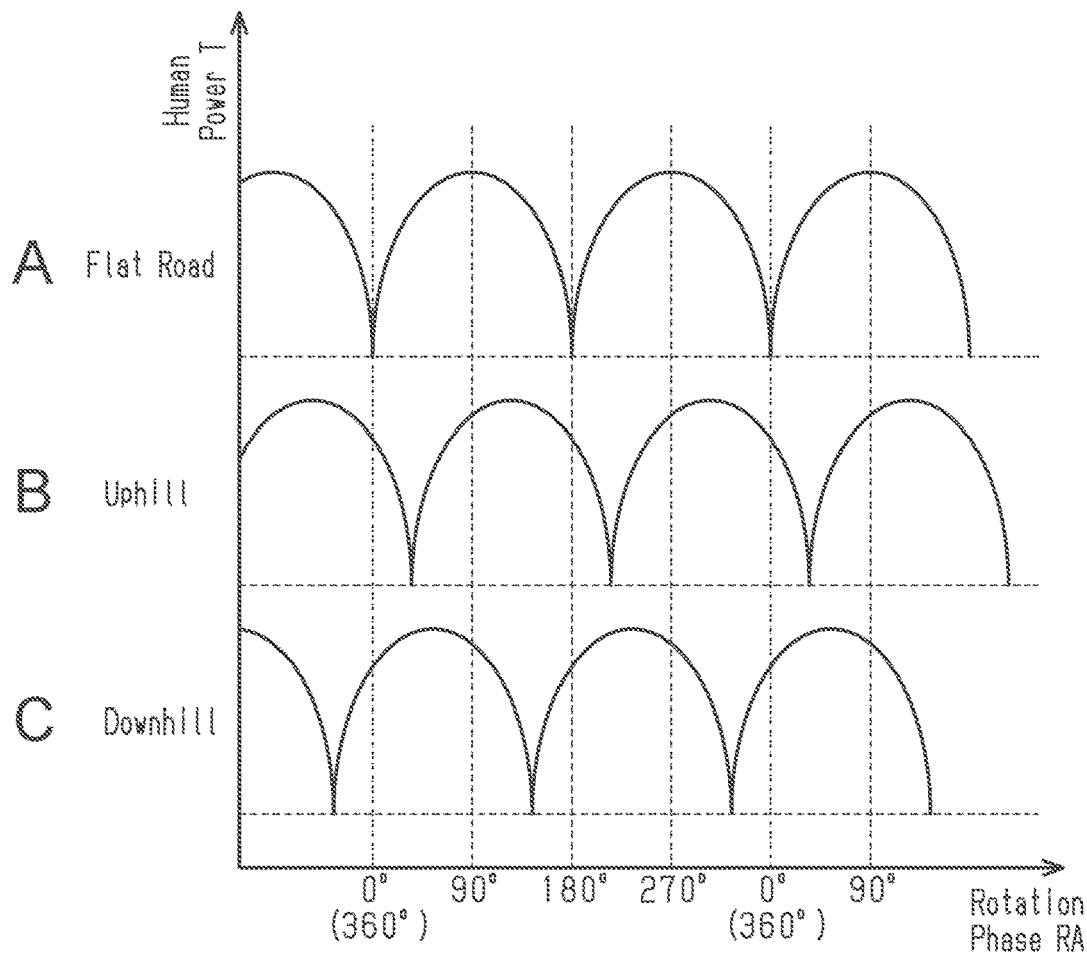
FIG. 6 is a graph showing the relationship between human power and the rotation phase corresponding to the inclination.
Figure 7:
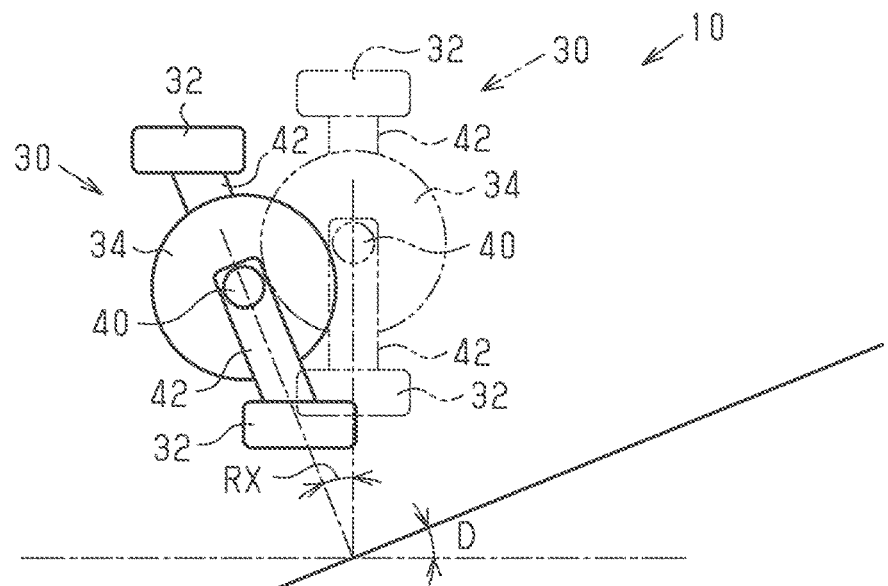
FIG. 7 is a diagram showing the crank when the bicycle is traveling uphill.

As shown in part B of FIG. 6 and FIG. 7, when the bicycle 10 is traveling on an uphill slope, the inclination D of which is greater than 0°, the human power T becomes minimal at timings after the top dead center position and the bottom dead center position (i.e., the crank rotation phase RA is 0°+|RX|° and 180°+|RX|°). Here, RX is the difference in phase between each of the top dead center position and the bottom dead center position and the rotation phase RA that is obtained when the human power T is minimal. The phase difference RX is substantially equal to the inclination D. When the inclination D is greater than 0°, the phase difference RX has a positive value. More specifically, as indicated by the double-dashed line shown in FIG. 7, when the crank arms 42 extend in the direction orthogonal to the road surface, the human power T is minimal.

Figure 8:
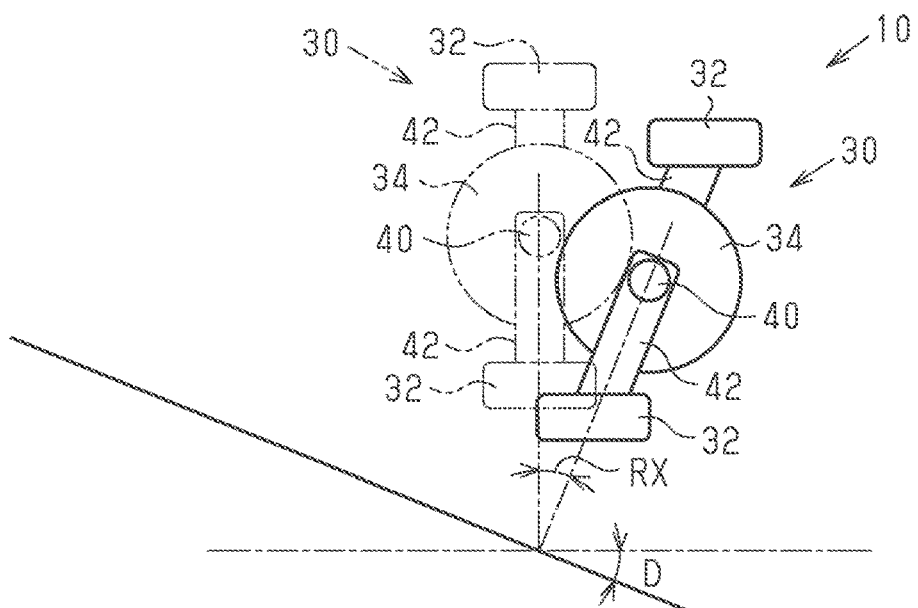
FIG. 8 is a diagram showing the crank when the bicycle is traveling downhill.

As shown in part A of FIG. 6 and FIG. 8, when the bicycle 10 is traveling on a downhill slope, the inclination D of which is less than 0°, the human power T becomes minimal at timings before the top dead center position and the bottom dead center position (i.e., the crank rotation phase RA is 0°−|RX|° and 180°−|RX|°). When the inclination D is less than 0°, the phase difference RX has a negative value. More specifically, as indicated by the double-dashed line shown in FIG. 8, the crank arms 42 extend in the direction orthogonal to the road surface, the human power T is minimal.

Figure 9:
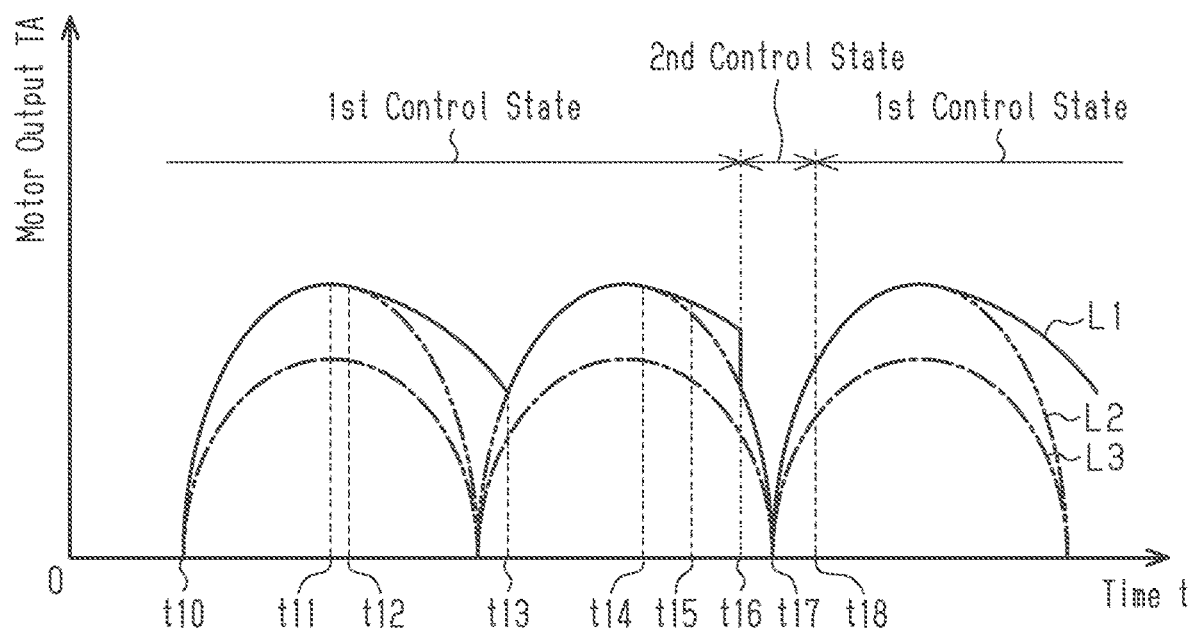
FIG. 9 is a time chart showing one example of an execution mode of the gear change control.

In FIG. 9, the solid line L1 indicates one example of the output TA of the motor 60 when the assist control of FIG. 3 is performed, the double-dashed line L2 indicates one example of an output of an imaginary motor 60 that does not undergo the process of step S14 in the assist control of FIG. 3, and the single-dashed line L3 indicates one example of temporal change in the human power T when the assist control is performed.

Time t10 indicates the time at which the rider starts to rotate the crank 30.

Time t11 indicates the time at which the human power T becomes maximal when the motor 60 is in the first control state.

Time t12 indicates the time at which the control unit 72 determines that the human power T has been decreased when the motor 60 is in the first control state. At this time, the control unit 72 corrects the output TA of the motor 60 (step S15 of FIG. 3) to increase the ratio of the output TA of the motor 60 to the human power T from that obtained at time t11.

Time t13 indicates the time at which the control unit 72 determines that the human power T has been increased when the motor 60 is in the first control state. At this time, the control unit 72 stops the correction of the output TA of the motor 60 to decrease the ratio of the output TA of the motor 60 to the human power T from those obtained at times t12 to t13.

Time t14 indicates the time at which the control unit 72 again determines that the human power T has been decreased when the motor 60 is in the first control state. At this time, the control unit 72 corrects the output TA of the motor 60 (step S15 of FIG. 3) to increase the ratio of the output TA of the motor 60 to the human power T from that obtained at time t11.

Time t15 indicates the time at which the control unit 72 receives the shift-up signal or the shift-down signal from the operation unit 20.

Time t16 indicates the time at which the crank rotation phase RA reaches the first phase R1. At this time, the control unit 72 switches the control state of the motor 60 to the second control state from the first control state. This decreases the output TA of the motor 60 to be equal to that indicated by the double-dashed line L2.

Time t17 indicates the time at which the crank rotation phase RA reaches the second phase R2. At this time, the control unit 72 operates the gear changer 54 based on the shift-up signal or the shift-down signal that was received at time t15.

Time t18 indicates the time at which the crank rotation phase RA reaches the third phase R3. At this time, the control unit 72 switches the control state of the motor 60 to the first control state from the second control state.

The bicycle controller 70 has the operation and advantages described below. When the inclination D is 0°, at time t17, the crank rotation phase RA is equal to the top dead center position or the bottom dead center position. When the inclination D is greater than 0°, at time t17, the crank rotation phase RA is retarded from the top dead center position or the bottom dead center position. When the inclination D is less than 0°, at time t17, the crank rotation phase RA is advanced from the top dead center position or the bottom dead center position. The control unit 72 changes the first phase R1 for changing the control state of the motor 60 to the second control state from the first control state in accordance with the inclination D. This decreases the output TA of the motor 60 at a timing immediately before the torque applied to the gear changer 54 becomes minimal. Thus, the control is performed in accordance with the riding condition of the bicycle 10.

The control unit 72 changes the second phase R2 for performing the gear change operation of the gear changer 54 in accordance with the inclination D. Thus, the gear change operation of the gear changer 54 is performed at a timing when the gear changer 54 receives the minimal torque. This improves the gear change performance. Consequently, the control is performed in accordance with the riding condition of the bicycle 10. Additionally, in the bicycle controller 70, both when the inclination D is 0° and when the inclination D is other than 0°, the gear change operation of the gear changer 54 is performed at a timing when the gear changer 54 receives the minimal torque. This reduces an unpleasant feel of the rider.

Modified Examples

The above description illustrates one embodiment of the bicycle controller according to the present invention and is not intended to be restrictive. The embodiment of the bicycle controller according to the present invention can be modified as follows. Further, two or more modified examples can be combined.

Figure 4:
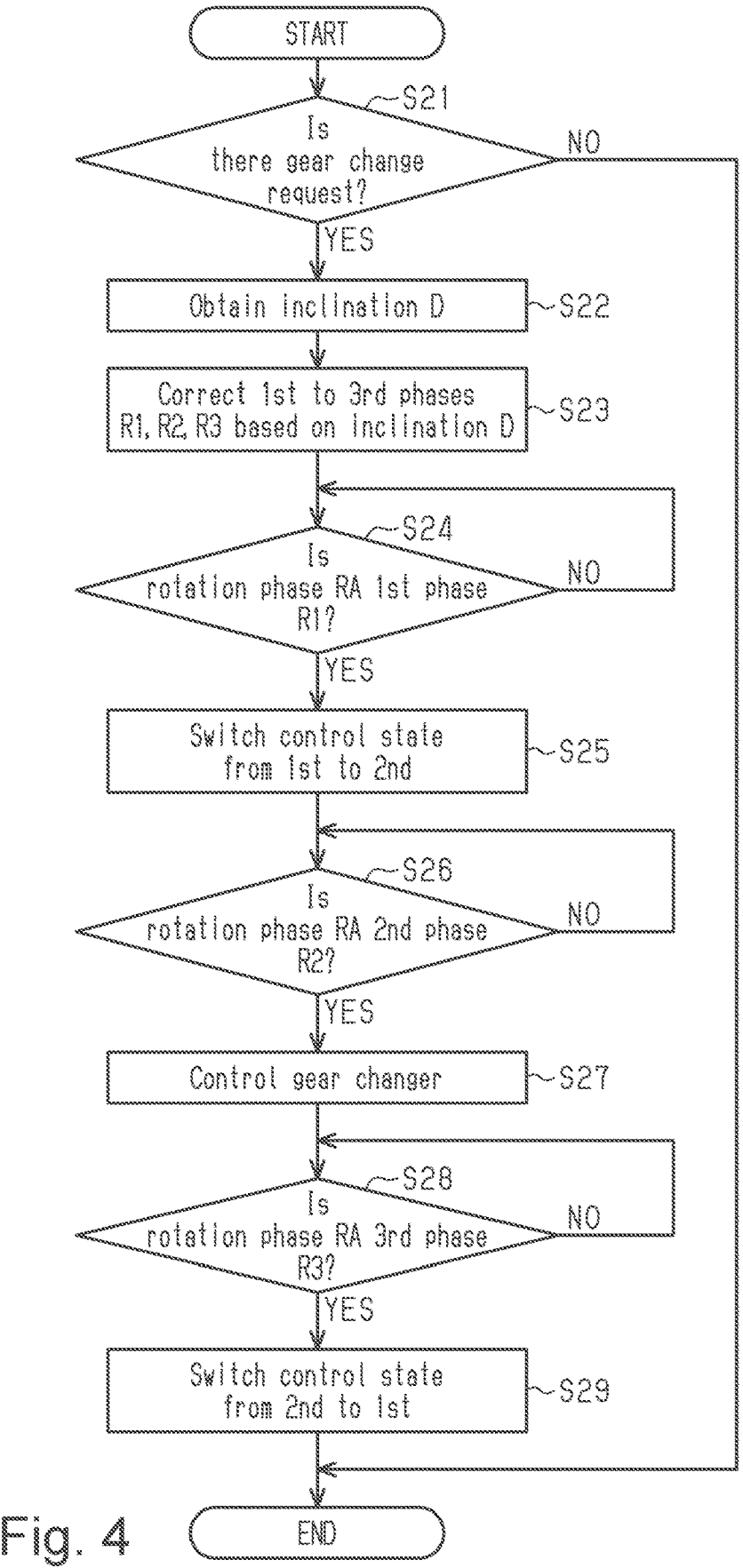
FIG. 4 is a flowchart showing gear change control performed by the control unit of FIG. 2.
Figure 5:
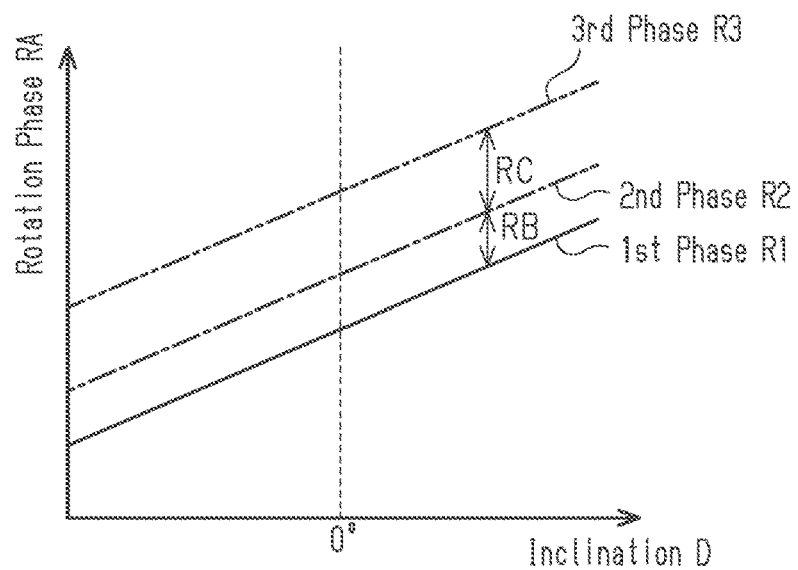
FIG. 5 is a map showing the relationship between the inclination and each of a first phase, a second phase and a third phase used in the gear change control.
Figure 10:
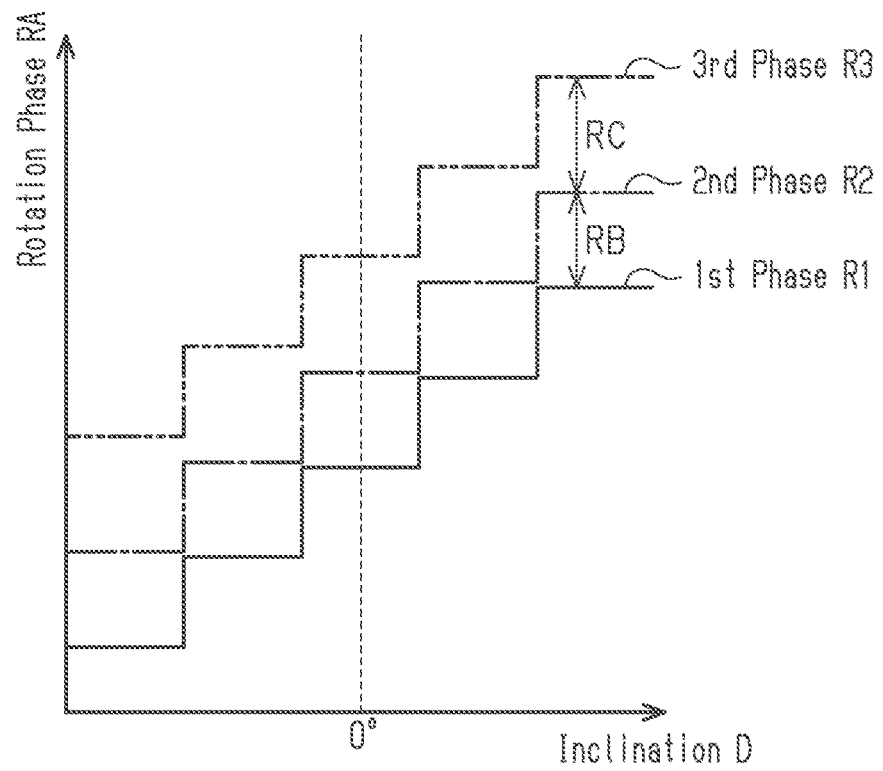
FIG. 10 is a map showing the relationship between the inclination and each of the first phase, the second phase and the third phase used in a first modified example of gear change control.

In step S23 of the gear change control shown in FIG. 4, at least one of the first phase R1, the second phase R2 and the third phase R3 can be changed in accordance with the inclination D in a stepped manner as shown in FIG. 10. Even in this case, it is preferred that the phase difference between the first phase R1 and the second phase R2 be greater than or equal to the predetermined phase RB at each inclination D. Also, it is preferred that the phase difference between the second phase R2 and the third phase R3 be greater than or equal to the predetermined phase RC at each inclination D.

Figure 11:
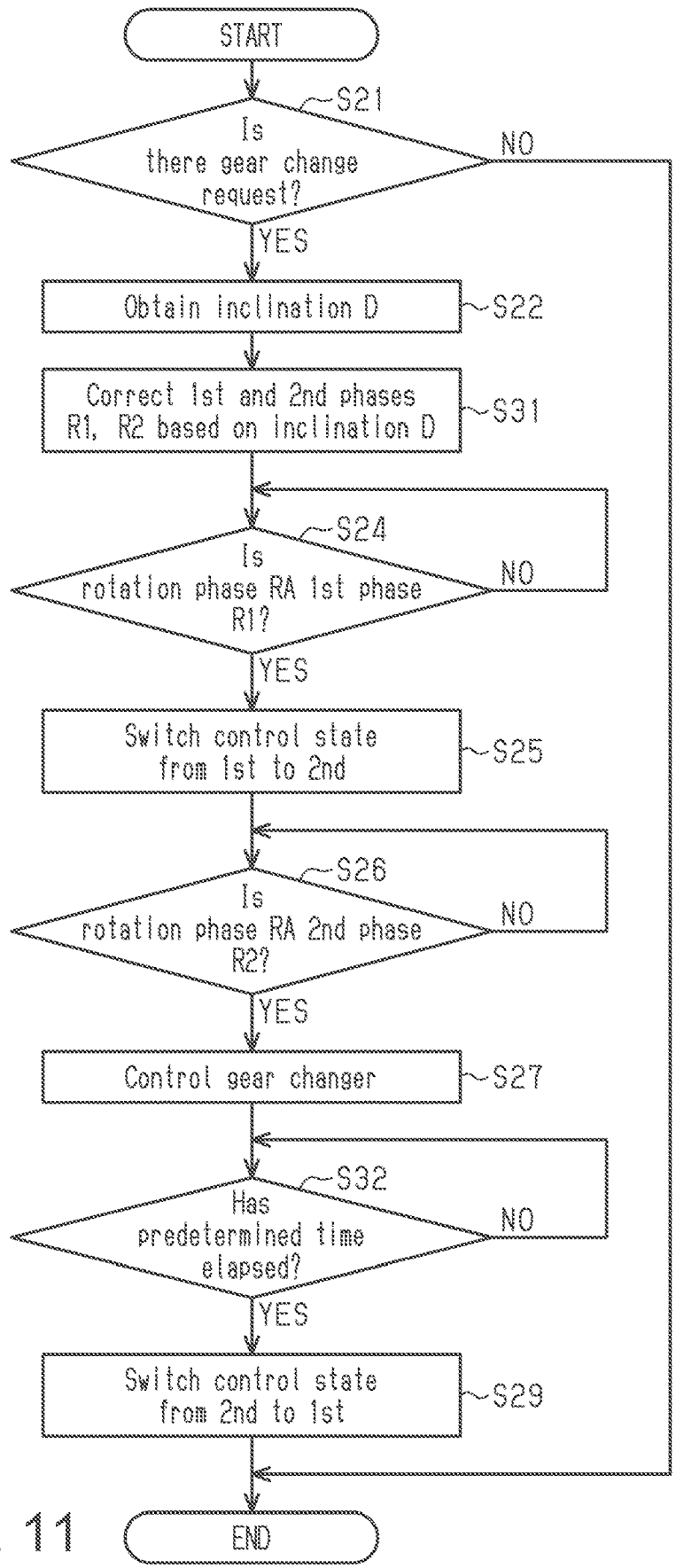
FIG. 11 is a flowchart showing a second modified example of gear change control.

The gear change control of FIG. 4 can be changed to that of FIG. 11. In the gear change control of FIG. 11, upon determining a predetermined time elapses from when the control state of the motor 60 is switched to the second control state from the first control state, the control unit 72 switches the control state of the motor 60 to the first control state from the second control state. More specifically, the control unit 72 performs the process of step S31 of FIG. 11 instead of the process of step S23 of FIG. 4. Also, the control unit 72 performs the process of step S32 of FIG. 11 instead of the process of step S28 of FIG. 4. In step S31, the control unit 72 corrects the first phase R1 and the second phase R2 based on the inclination D. In step S32, upon determining that the predetermined time has elapsed, the control unit 72 proceeds to step S29. Upon determining that the predetermined time has not elapsed, the control unit 72 repeats the process of step S32 until the predetermined time elapses. The predetermined time is stored in the memory 74 in advance. The predetermined time is a time that is sufficient for the gear changer 54 to complete the gear change operation. Further, the process of step S32 can be changed to a process in which the control unit 72 switches the control state of the motor 60 to the first control state from the second control state when a predetermined time elapses from when the gear changer 54 starts the gear change operation in step S27.

Figure 12:
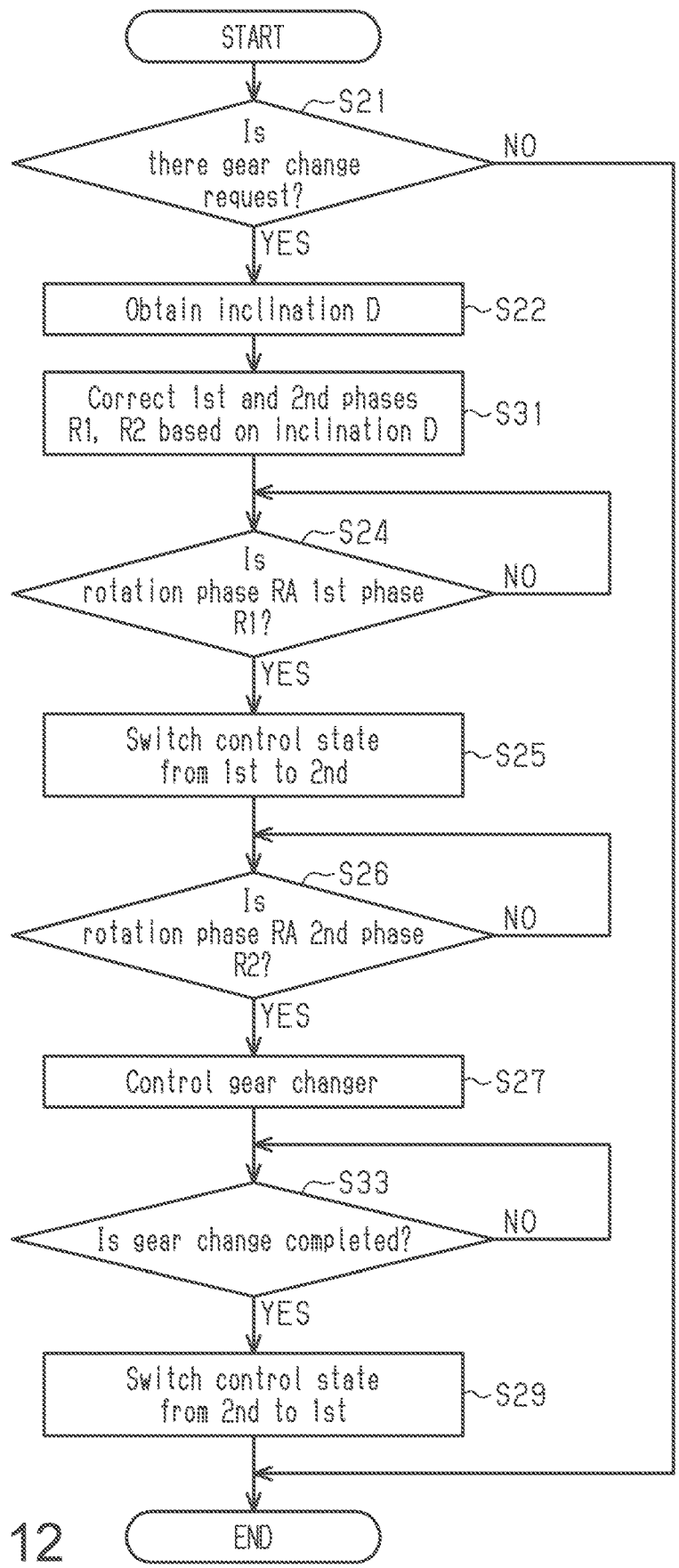
FIG. 12 is a flowchart showing a third modified example of gear change control.

The gear change control of FIG. 11 can be changed to that of FIG. 12. In the gear change control of FIG. 12, upon determining the operation of the gear changer 54 is completed while the motor 60 is in the second control state, the control unit 72 switches the control state of the motor 60 to the first control state from the second control state. More specifically, the control unit 72 performs the process of step S33 of FIG. 12 instead of the process of step S32 of FIG. 11. In step S33, upon determining that the gear change has been completed, the control unit 72 proceeds to step S29. Upon determining that the gear change has not been completed, the control unit 72 repeats the process of step S33 until the gear change is completed. The completion of the gear change is determined, for example, by outputs of a gear change state detection sensor arranged on the bicycle controller 70. The gear change state sensor is configured to detect the engagement state of the gears of the gear changer 54.

Figure 13:
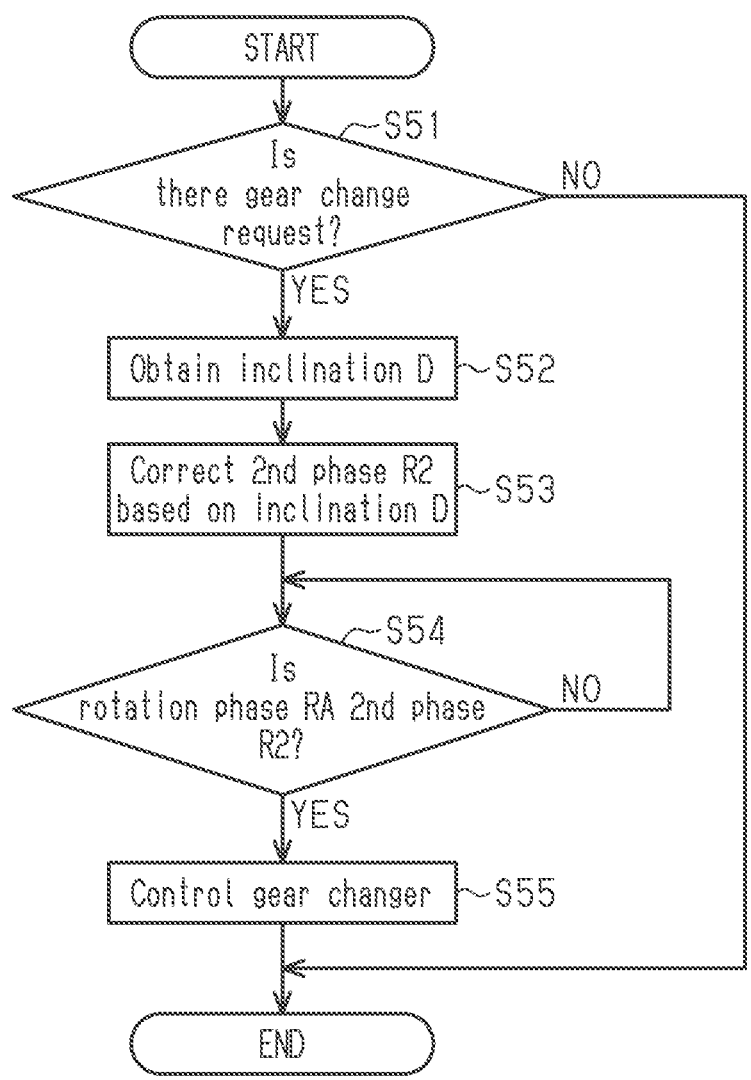
FIG. 13 is a flowchart showing a fourth modified example of gear change control.

The gear change control of FIG. 4 can be changed to that of FIG. 13. In the gear change control of FIG. 13, the control unit 72 operates the gear changer 54 upon determining the crank rotation phase RA is the second phase R2, and changes the second phase R2 based on the inclination D of the bicycle 10 in the front-rear direction. More specifically, in step S51, the control unit 72 determines whether or not there is a gear change request. That is, the control unit 72 determines whether or not the shift-up signal or the shift-down signal has been received. Upon determining that there is a gear change request, in step S52, the control unit 72 obtains the inclination D and proceeds to step S53. In step S53, the control unit 72 sets the second phase R2 based on the inclination D. In step S54, the control unit 72 determines whether or not the rotation phase RA has reached the second phase R2. Upon determining the rotation phase RA is not the second phase R2, the control unit 72 performs the process of step S54 again after a predetermined period. The control unit 72 repeats the process of step S54 until the rotation phase RA reaches the second phase R2. Upon determining the rotation phase RA has reached the second phase R2, the control unit 72 proceeds to step S55 and operates the gear changer 54 based on the gear change signal and then ends the current process. In this modified example, the assist device 52 can be omitted from the bicycle 10.

The second phase R2 can be set to be substantially equal to the first phase R1. In this case, the switching from the first control state to the second control state simultaneously starts to decrease the output TA of the motor 60 and perform the gear change operation of the gear changer 54.

In the gear change control, the control unit 72 can operate the gear changer 54 based on the human power T. More specifically, in the process of step S26 of the gear change control shown in FIG. 4, the control unit 72 determines whether or not the human power T has becomes less than or equal to predetermined human power T. The predetermined human power T is set such that the gear change operation of the gear changer 54 is appropriately performed.

The actuator 56 can be omitted from the gear change device 50. In this case, the bicycle 10 includes an operation portion that is mechanically connected to the gear changer 54. Upon determining the operation amount of the operation portion becomes greater than or equal to a predetermined amount, the gear change operation of the gear changer 54 is performed. The bicycle controller 70 includes a detection portion that is configured to transmit a detection signal to the control unit 72 upon determining the operation amount of the operation portion is less than the predetermined amount. In step S21 of the gear change control shown in FIG. 4, the control unit 72 can recognize that the operation of the operation portion is started based on outputs of the detection portion to determine whether or not there is a gear change request. In this case, step S26 is omitted from the gear change control of FIG. 4, and instead of step S27, the gear change control is mechanically performed on the gear changer 54 upon determining the operation amount of the operation portion is greater than or equal to the predetermined amount. In this case, the gear change device 50 can include a restriction mechanism that restricts the gear change operation of the gear changer 54. The restriction mechanism restricts the gear change operation of the gear changer 54 unless the rotation phase RA is a predetermined phase (e.g., second rotation phase R2) and allows the gear change operation of the gear changer 54 upon determining the rotation phase RA is the predetermined phase. Alternatively, the restriction mechanism restricts the gear change operation of the gear changer 54 upon determining the human power T is greater than predetermined human power T and allows the gear change operation of the gear changer 54 when the human power T is less than or equal to the predetermined human power T. The restriction mechanism can be configured to restrict the gear change operation of the gear changer 54 by limiting the operation amount of the operation portion to the predetermined amount or less.

In step S21 of the gear change control shown in FIG. 4, the control unit 72 determines that there is a gear change request when receiving the gear change signal from the operation unit 20. Instead, the control unit 72 can set a gear change request in accordance with the riding condition. In this case, the control unit 72, for example, sets a gear change request for changing the gear ratio r based on the crank rotational speed CA. Upon determining the crank rotational speed CA is greater than a first predetermined rotational speed CA, the control unit 72 changes the gear changer 54 to decrease the gear ratio r. Upon determining the crank rotational speed CA is less than a second predetermined rotational speed CA, the control unit 72 changes the gear changer 54 to increase the gear ratio r.

Instead of step S14 and step S15 of the assist control shown in FIG. 3, the control unit 72 can perform a process for correcting the output TA of the motor 60 to a constant value.

In the assist control of FIG. 3, in step S13, upon determining the motor 60 is in the second control state, the control unit 72 proceeds to step S16 without correcting the output TA of the motor 60. Instead, the control unit 72 can correct the output TA of the motor 60 and then proceed to step S16. In this case, the output TA of the motor 60 is decreased to be less than the output TA of the motor 60 that was calculated in step S12.

The control unit 72 can obtain the inclination D from the global positioning system (GPS). The control unit 72 receives information of the inclination D from the GPS, for example, through a cyclocomputer, a smartphone, or the like. Alternatively, the control unit 72 can obtain the inclination D that is inputted by the operator.

The control unit 72 can estimate the crank rotation phase RA from the crank rotational speed CA. The crank rotation phase RA is estimated, for example, by multiplying the time from when the crank 30 passed the reference phase (top dead center position or bottom dead center position) and the crank rotational speed CA.

The control unit 72 can estimate the crank rotational speed CA from the vehicle speed V. The control unit 72 estimates the crank rotational speed CA, for example, from the tire diameter and the gear ratio r. In this case, the control unit 72 can also calculate the crank rotation phase RA based on the crank rotational speed CA, which is calculated from the vehicle speed V. The control unit 72 uses the estimated crank rotational speed CA to estimate the time when the crank 30 passed the reference phase (top dead center position or bottom dead center position). Then, the control unit 72 estimates the crank rotation phase RA by multiplying the time from when the crank 30 passed the reference phase (top dead center position or bottom dead center position) and the vehicle speed V.

The gear change device 50 can be changed to a hub gear located in the hub of the rear wheel 14.

The gear change device 50 can be changed to a gear change device that includes a derailleur gear and an actuator. The derailleur gear is a front derailleur or a rear derailleur. The actuator is, for example, an electric motor. The control unit 72 drives the actuator to operate the derailleur gear. The derailleur gear changes the number of rotations of the rear wheel 14 relative to the number of rotations of the crank 30 of bicycle 10 (gear ratio r) by changing the sprocket that the chain 38 runs around among a plurality of front sprockets 34 or a plurality of rear sprockets 36.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle component. Accordingly, these directional terms, as utilized to describe the bicycle component should be interpreted relative to a bicycle in an upright riding position on a horizontal surface and that is equipped with the bicycle component. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle controller comprising:
an electronic controller including a processor, the electronic controller being configured to control an output of a motor that assists human power inputted to a bicycle, the electronic controller calculating a value of the output of the motor based on a detected value of human power and controlling the output of the motor based on the calculated value,
the electronic controller being further configured to:
 determine whether gear change request to change a gear ratio of the bicycle has been received,
 determine whether a rotation phase of a crank of the bicycle has reached a first phase after receiving the gear change request, the first phase being set based on an inclination of the bicycle in a front-rear direction,
 switch a control state of the motor from a first control state to a second control state upon determining that the rotation phase has reached the first phase after receiving the gear change request,
 while the control state of the motor is the second control state, operate a gear changer of the bicycle after receiving the gear change request and use the calculated value of the output of the motor without modifying the calculated value,
 while the control state of the motor is the first control state, repeatedly determine whether the detected value of human power is decreasing by determining whether a currently detected value of human power is smaller than an immediately preceding detected value of human power, and
 upon determining that the detected value of human power is decreasing while the control state of the motor is the first control state, modify the calculated value of the output of the motor such that the modified calculated value is greater than the calculated value and such that a ratio of the output of the motor with respect to the detected value of human power is larger than when the detected value of human power is decreasing while the motor is in the second control state, the modification being made such that the output decreases at a slower rate than while the motor is in the second control state.

2. The bicycle controller according to claim 1, wherein upon determining the inclination is greater than 0° and an uphill gradient, the electronic controller is configured to retard the first phase from that set for the inclination of 0°.

3. The bicycle controller according to claim 1, wherein upon determining the inclination is less than 0° and a downhill gradient, the electronic controller is configured to advance the first phase from that set for the inclination of 0°.

4. The bicycle controller according to claim 1, wherein the electronic controller further is configured to retard the first phase as the inclination increases.

5. The bicycle controller according to claim 1, wherein upon determining the rotation phase of the crank reaches a third phase while the motor is in the second control state, the electronic controller is configured to switch the control state of the motor from the second control state to the first control state.

6. The bicycle controller according to claim 1, wherein upon determining a predetermined time elapses from when switching the control state of the motor from the first control state to the second control state, the electronic controller is configured to switch the control state of the motor from the second control state to the first control state.

7. The bicycle controller according to claim 1, wherein upon determining an operation of a gear changer in response to the gear change request is completed while the motor is in the second control state, the electronic controller is configured to switch the control state of the motor from the second control state to the first control state.

8. The bicycle controller according to claim 1, wherein upon determining the detected value of human power is decreasing while the motor is in the first control state, the electronic controller is configured to modify the calculated value of the output of the motor such that the ratio is greater than when the detected value of human power is increasing while the motor is in the first control state.

9. The bicycle controller according to claim 1, wherein the gear change request is a gear change signal from an operation unit, and
after receiving the gear change signal, the electronic controller is configured to operate the gear changer when the rotation phase of the crank is a second phase.

10. The bicycle controller according to claim 9, wherein the electronic controller is configured to change the second phase based on the inclination.

11. The bicycle controller according to claim 9, wherein upon determining the inclination is 0°, the electronic controller is configured to set the second phase to be substantially equal to a rotation phase of the crank when the crank is located at one of a top dead center position and a bottom dead center position.

12. The bicycle controller according to claim 9, wherein upon determining the inclination is greater than 0° and an uphill gradient, the electronic controller is configured to retard the second phase from that set for the inclination of 0°.

13. The bicycle controller according to claim 9, wherein upon determining the inclination is less than 0° and a downward gradient, the electronic controller is configured to advance the second phase from that set for the inclination of 0°.

14. The bicycle controller according to claim 9, wherein the electronic controller further is configured to retard the second phase as the inclination increases.

15. The bicycle controller according to claim 9, wherein upon determining the rotation phase of the crank of the bicycle is a first phase, the electronic controller is configured to switch the control state of the motor from the first control state to the second control state, and set the second phase to be substantially equal to the first phase or retarded from the first phase by a predetermined phase.

16. The bicycle controller according to claim 1, wherein the electronic controller is configured to calculate the inclination based on an output of an inclination sensor that detects the inclination.

17. The bicycle controller according to claim 1, wherein the electronic controller is configured to calculate the rotation phase of the crank based on an output of a sensor that detects the rotation phase of the crank.

18. The bicycle controller according to claim 1, wherein the electronic controller modifies the calculated value by using a first-order low-pass filter.

19. The bicycle controller according to claim 18, wherein the electronic controller is configured to change a time constant of the first-order low-pass filter in accordance with a rotational speed of the crank.

20. The bicycle controller according to claim 1, wherein the electronic controller is further configured to:
    operate the gear changer when the rotation phase of the crank reaches a second phase after the electronic controller has received the gear change request and switched the control state of the motor from the first control state to the second control state, the second phase being retarded from the first phase, and
    switch the control state of the motor from the second control state to the first control state when the rotation phase reaches a third phase while the motor is in the second control state, the third phase being retarded from the second phase.

21. A bicycle controller comprising:
    an electronic controller including a processor, the electronic controller being configured to control an output of a motor that assists human power inputted to a bicycle, the electronic controller calculating a value of the output of the motor based on a detected value of human power and controlling the output of the motor based on the calculated value,
    the electronic controller being further configured to:
        determine whether a gear change request to change a gear ratio of the bicycle has been received,
        determine whether a rotation phase of a crank of the bicycle has reached a first phase after receiving the gear change request, the first phase being set based on an inclination of the bicycle in a front-rear direction,
        switch a control state of the motor from a first control state to a second control state upon determining that the rotation phase has reached the first phase after receiving the gear change request,
        while the control state of the motor is the second control state, operate a gear changer of the bicycle after receiving the gear change request and use the calculated value of the output of the motor without modifying the calculated value,
        while the control state of the motor is the first control state, repeatedly determine whether the detected value of human power is decreasing by determining whether a currently detected value of human power is smaller than an immediately preceding detected value of human power, and
        upon determining that the detected value of human power is decreasing while the control state of the motor is the first control state, modify the calculated value of the output of the motor such that the modified calculated value is greater than the calculated value and such that a ratio of the output of the motor with respect to the detected value of human power is larger than when the detected value of human power is decreasing while the motor is in the second control state, and
        upon determining that the detected value of human power is increasing, use the calculated value of the output of the motor without modifying the calculated value such that the ratio is the same regardless of whether the motor is in the first control state or the second control state.

\* \* \* \* \*